Feb. 22, 1944.   J. V. HOWE   2,342,143
REAMER
Filed Oct. 16, 1941
Fig. 1.
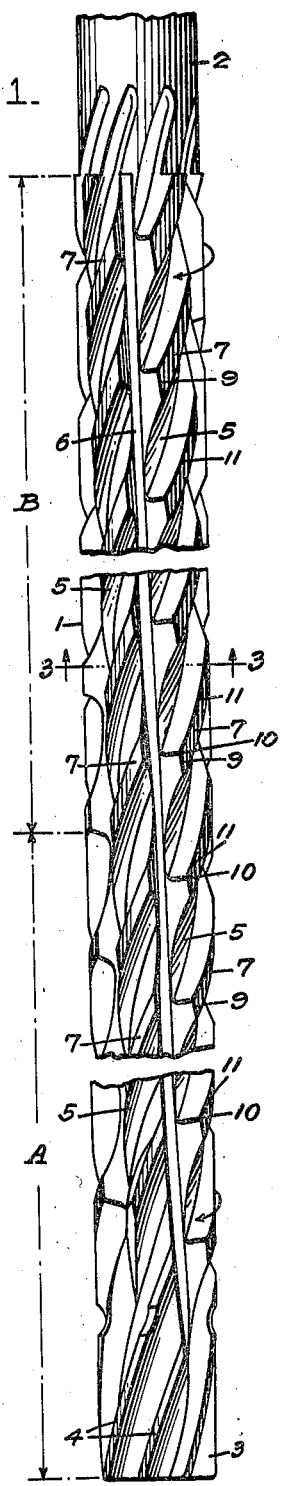
Fig. 2.
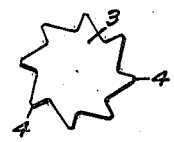
Fig. 3.   Fig. 4.
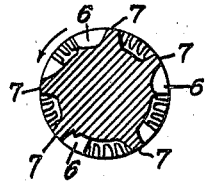 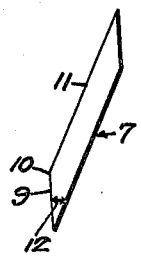
Fig. 5.
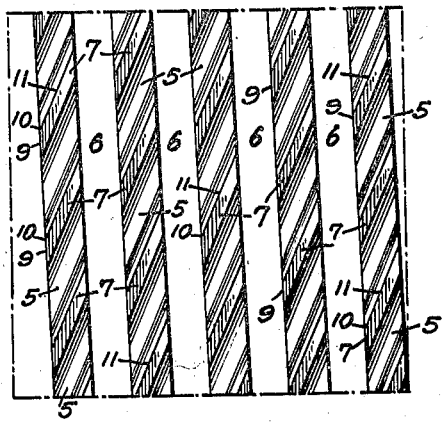
Inventor
James V. Howe
By G. A. Kessenich & J. H. Church
Attorneys Patented Feb. 22, 1944

2,342,143

UNITED STATES PATENT OFFICE 2,342,143

REAMER

James V. Howe, Philadelphia, Pa.

Application October 16, 1941, Serial No. 415,247

11 Claims. (Cl. 77—72)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to a reamer.

An object of the invention is to provide a reamer which will produce a smooth, unbroken bore.

Another object of the invention is to provide a reamer which is relatively easy to manufacture, has a long, accurate tool life and is capable of greater speed of production.

The specific nature of the invention as well as other objects and advantages thereof will clearly appear from a description of a preferred embodiment as shown in the accompanying drawing in which:

Fig. 1 is a view in side elevation of the reamer.

Fig. 2 is a forward end view thereof,

Fig. 3 is a sectional view on the line 3—3 of Fig. 1,

Fig. 4 is an enlarged elevational view of one of the cutting ribs, and

Fig. 5 is a fragmentary development of the surface of the reamer.

Referring to the drawing, the reamer comprises an elongated body 1 conditioned at its rear end to form a tang 2 which is adapted to engage a device that rotates and advances it axially. The head or forward portion of the device is provided with pilot reamer 3 having conventional spiral cutters 4. These cutters terminate a short distance in back of the front end. A plurality of parallel spiral grooves 5 in the form of right-handed convolutions lie intermediate the tang 2 and the pilot reamer 3 and, if desired, may constitute a continuation of the grooves of the pilot reamer. Intersecting these grooves are a number of spaced flutes 6 which have a slight left-handed twist. These flutes are steep incisions which extend substantially parallel to the axis of the body 1 and terminate at the top of the pilot reamer 3. The angle which a groove 5 makes with the axis of the reamer should be greater than the angle a flute 6 makes with that axis for best results. The front end of the reamer is preferably, though not necessarily, tapered in the region referred to as A and has a uniform diameter at B.

The above description has reference to a reamer intended for clockwise rotation as it is being advanced into a bore. When the rotation is intended to be counterclockwise, the grooves 5 are left-handed spirals and the flutes 6 are right-handed.

The first mentioned pattern of grooves and flutes produces numerous series of ribs or lands 7 which slope upwardly to the right. The top faces of these lands are smooth cylindrical surfaces. Each land is provided with a cutting edge 9, a cutting corner 10, a smoothing or rubbing edge 11, and a salient angle 12, see Figs. 1, 4, and 5.

A bore is reamed to its proper dimension by inserting the pilot reamer 3 and applying a combined rotary and axial movement to the reamer tang by suitable means. The cutting corner 10 of each land is first to pierce the metal surrounding the bore whereupon the cutting edge 9 lifts or removes a chip. As the reamer rotates in a clockwise direction, the chip moves into the groove 5 adjoining the smoothing edge 11 and is fed upwardly through the groove and flutes 6 to the head 2 of the tool. The angular arrangement of the cutting corner 10 and the comparatively narrow cutting edge 9 results in the chip coming off in the form of a continuous ribbon-like curl. This materially assists in producing a smooth even cut in the bore which could not result if the metal was torn off in a series of individual chips. The trailing edge 11 engages the bore after the removal of a curl and acts as a smoothing or rubbing member thereby producing a superior bore having a uniform diameter throughout. The spiral pattern of the ribs insures that a smoothing edge will succeed the action of a cutting edge and also serves to advance the tool into the bore thereby promoting the speed of operation. The acuteness of the salient angle 12 permits the reamer to respond readily to the combined rotary and axial movement applied to the tang and hence reduces the energy and time consumed during a reaming operation.

In order that a smoothing edge will succeed the action of a cutting edge, as set forth above, the size and disposition of the ribs and flutes are so chosen that the zone defined by a cutting edge 9 is occupied by at least one unbroken portion of a smoothing edge 11 positioned between said cutting edge and the next cutting edge following it in rotation of the reamer. The term zone as used herein has its customary geometrical significance. A zone defined by a cutting edge includes that portion of the surface of the reamer lying between planes intersecting the respective ends of a cutting edge and being perpendicular to the reamer axis.

A most satisfactory reamer is provided when the grooves 5 and the flutes 6 are concave and have substantially the same width. This type of channel lends itself to repeated sharpening of the cutting faces and prolongs the useful life of a tool subjected to extremely hard usage. When these members extend spirally in opposite directions as shown in Fig. 1 best results are obtained. A very effective reamer is produced when the pitch of the flutes is at least ten times that of the grooves. Pitch in this instance refers to the distance from a point on one flute to a corresponding point on an adjacent flute measured parallel to the axis of the reamer. Apparently the cutting corners 10 and the cutting edges 9 assume a most advantageous angular relationship for a clockwise rotating reamer. The left-hand helical contour of the flutes 6 provides the proper angularly disposed cutting edges and also allows a free and easy clearance of chips so that the reamer will not stick. As a result the metal underneath the cut in the bore is not disturbed and remains smooth and unbroken.

The tapered front end A of the reamer permits that portion to progressively increase the diameter of the bore as it advances. The correct diameter is reached at the junction of part A with part B. This last portion of the tool does no appreciable work but serves to align the reamer properly as the operative end A moves further into the bore. The tool is thereby steadied and irregularities in the bore are avoided.

It will be seen from the above description of the invention that the reamer promotes a greater speed of operation, a smaller expenditure of energy, and that a smooth accurate bore results.

I claim:

1. In a reamer adapted to be rotated in a clockwise direction, a body, said body having a plurality of parallel right-handed helical ribs and a plurality of parallel flutes extending spirally in a left hand direction and intersecting said ribs, the pitch of the flutes being at least ten times the pitch of said ribs.

2. In a tool, a body, interrupted helical work conditioning ribs on said body, each of said ribs having a land conforming to a cylindrical parallelogram with a cutting edge and a smoothing edge, said smoothing edge being angularly disposed to the cutting edge, and said cutting edge being directed in advance of the smoothing edge in the direction of progress of the tool.

3. In a tool, a body provided with a tang at one end thereof, interrupted helical work conditioning ribs on said body terminating at said tang, each of said ribs having a land including a long smoothing edge and a short cutting edge, said smoothing edge arranged between the cutting edge and the tang.

4. In a reamer, a body, a plurality of spaced helical ribs on said body, and a plurality of spaced helical flutes of opposite hand to said ribs intersecting said ribs to define a plurality of cutting lands, each of said lands having a relatively short lower cutting edge defined by the intersection of one of said ribs by one of said flutes and a relatively long smoothing edge.

5. In a reamer, a body, a plurality of spaced helical ribs on said body, and a plurality of spaced helical flutes of opposite hand to said ribs intersecting said ribs to define a plurality of cutting lands, the pitch of said flutes being substantially greater than the pitch of said ribs, each of said lands having a relatively short lower cutting edge defined by the intersection of one of said ribs by one of said flutes and a relatively long smoothing edge.

6. In a reamer, a body, a plurality of spaced helical ribs on said body, and a plurality of spaced helical flutes of opposite hand to said ribs intersecting said ribs to define a plurality of cutting lands, the pitch of said flutes being at least ten times the pitch of said ribs, each of said lands having a relatively short lower cutting edge defined by the intersection of one of said ribs by one of said flutes and a relatively long smoothing edge.

7. In a reamer adapted to be operated in a clockwise direction, a body, a plurality of spaced parallel right-handed helical ribs on said body, and a plurality of spaced parallel left-handed helical flutes intersecting said ribs to define a plurality of cutting lands, the pitch of said flutes being substantially greater than the pitch of said ribs, each of said lands having a relatively short cutting lower edge defined by the intersection of one of said ribs by one of said flutes and a relatively long smoothing edge.

8. In a reamer adapted to be operated in a clockwise direction, a body, a plurality of spaced parallel right-handed helical ribs on said body, and a plurality of spaced parallel left-handed helical flutes intersecting said ribs to define a plurality of cutting lands, the pitch of said flutes being at least ten times the pitch of said ribs, each of said lands having a relatively short lower cutting edge defined by the intersection of one of said ribs by one of said flutes and a relatively long smoothing edge.

9. In a reamer adapted to be operated in a clockwise direction, a body, a pilot cutter on one end of said body, a plurality of spaced parallel right-handed helical ribs on the remaining portion of said body, said body having a plurality of spaced parallel left-handed helical flutes intersecting said ribs to define a plurality of cutting lands having lower cutting edges, said flutes terminating at the inner end of said pilot cutter, said ribs continuing into the pilot cutter forming cutting ribs thereon.

10. In a reamer adapted to be operated in a clockwise direction, a body, a plurality of spaced parallel right-handed helical ribs on said body, a plurality of spaced parallel left-handed helical flutes intersecting said ribs to define a plurality of cutting lands, said flutes being relatively slightly inclined to the axis of said reamer and having a pitch at least ten times the pitch of said ribs, each of said lands having a relatively short lower cutting edge defined by the intersection of one of said ribs by one of said flutes and a relatively long smoothing edge on the entering side of said land.

11. In a reamer, a body, a plurality of spaced helical ribs on said body, and a plurality of spaced helical flutes of opposite hand to the ribs and intersecting the ribs to define a plurality of cutting lands, each of said lands having a smoothing edge and a relatively short lower cutting edge, said cutting edges being staggered circumferentially with respect to one another and in central relation to the smoothing edges of the adjacent following land so that the smoothing edges of one land overlap the smoothing edges of the leading land.

JAMES V. HOWE.